July 3, 1945.  M. GALLO  2,379,515
ELECTRODE HOLDER
Filed June 5, 1943
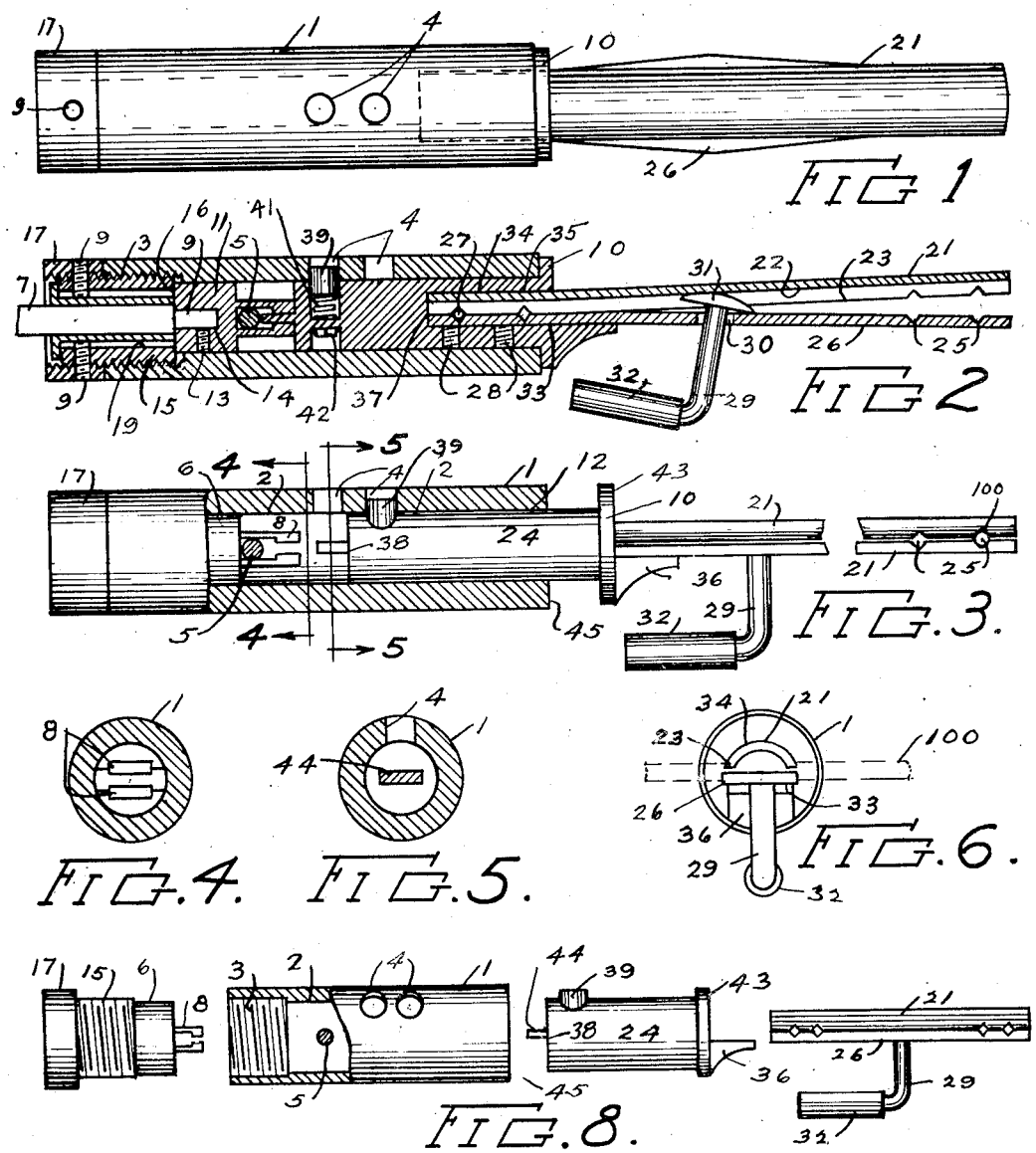
Inventor
MICHAEL GALLO.
By Howard J. Whelan
Attorney Patented July 3, 1945

2,379,515

UNITED STATES PATENT OFFICE 2,379,515

ELECTRODE HOLDER

Michael Gallo, Baltimore, Md.

Application June 5, 1943, Serial No. 489,729

1 Claim. (Cl. 219—8)

This invention refers to electrical welding equipment and more particularly to holders for supporting welding rod and electrodes, for welding purposes by manual operation. It has among its objects to provide electrode holding jaws that will obviate the effect of spattering or globules of molten metal lodging so as to prevent the jaws from closing properly or aligning the welding rod therein in the normal manner. Another object is to provide a holder that can be adjusted so as to be self insulating when not in normal operation. A further object is to have the holder designed for easy detachment from the electricity feeding cable, so its bare parts can be removed as a unit and compactly held in the pocket of the user or in some other convenient place. A still further object is to keep the end portion of the feeding cable covered and insulated by the remaining part of the holder, so the former may be laid on the ground or vicinity of the place of operation without danger of short-circuiting or injury to persons. Still another object provides for the positioning of the unit so it can be deenergized and disconnected from the feeding cable, without the use of a switch, when not in operation, even though the bare parts are exposed and connected in the unit. Other objects are to provide for flexible connections for keeping the cable and holder attached suitably together; for eliminating projecting parts that might interfere with the work or the user or create dangerous situations; and for enabling the unit to be removed without contact with the flesh or fingers of the hand. Other objects will become apparent as the invention is more fully set forth.

Previously, developments in the construction of electrode holders have not adequately provided for the facile removal of the live or bare parts of the implements when not in use. The operator usually has to look around for a safe place to lay the device down, and winds up by taking a chance of some location near to him at the moment. He is required to disconnect the circuit feeding the jaws of the holder and take the considerable time and trouble necessary to do so. This means, it is frequently not done properly and dangerous conditions result. The bare parts project out from the holder and make situations that tend to cause harm to life, limb and property. This invention eliminates these dangers by providing a jaw unit that can be removed complete from the holder and leave the handle part thereof attached to the feeding cable, covering the live ends of the latter so they are not open to contact with anyone or anything. Also the device provides jaws that will not be so damaged, that they will not hold the electrodes properly when changed, due to the spatterings getting in between the faces of the holding surfaces that press against the sides of the electrodes. The removal of the jaw unit is arranged for by the use of a sunken catch that must be operated by a stick or the like, working with its point some distance from the fingers of the operator. Other features will be referred to in the description of the structure and its operation.

In the drawing which illustrates an embodiment of this invention:

Figure 1 is a plan view of the device embodying this invention,

Figure 2 is a side elevation of Figure 1 partly in section showing the electric current connecting element in closed position, Figure 3 is a side view of Figure 1 partly in section showing the electric current connecting element in open position, Figure 4 is a sectional view taken along line 4—4 of Figure 3 looking in the direction of the arrows, Figure 5 is a sectional view taken along line 5—5 of Figure 3 looking in the direction of the arrows, Figure 6 is an end view of the device showing the jaws, Figure 7 is an end view of the device showing the cable connecting end, and Figure 8 is a side elevation of the device partly in section, showing the parts disengaged.

Similar reference characters refer to similar parts throughout the drawing.

In the structure of the device, a handle 1, forms the intermediate section of an electrode holder. It is of insulating material of a rigid nature. It is hollow, having a cylindrical passage 2 running through from one end to the other, having one end portion 3 screw threaded for about one-third of the way. The other end portion 12 of the passage receives the jaw unit and definitely positions it therein. Two lateral holes 4 extend through the wall of this portion as indicated, and are in line longitudinally and parallel with the axis of the handle. A wire cross bar 5 crosses the passage 2 transversely near the middle of the handle and serves to regulate the position of the cable insertion plug 6 on one side and the contacting portions of the jaw unit 10 on the other. The electric feeding cable 7 is of conventional type with its end portion 9 soldered or otherwise attached into a cylindrical metal lug 11 having spring knife U-bent blades 8 extending in front of it. The screws 13 only one of which is shown additionally hold the cable in place inside the lug hole 14 and assure of good contact between them for the flow of current through same. An externally screw-threaded barrel piece 15 is placed on the cable in back of the lug 11 and presses against the bottom surface 16 of the latter. This barrel piece screws into the threaded portion 3 of the handle and forces the lug into the latter until the blades 8 attached to the lug, straddle the cross bar 5 and locate themselves thereon to keep the lugs in predetermined position. An insulated sleeve 17 surmounts the rear of the barrel piece 15 to protect the hands of the operator from contact with any of the conducting parts. It is of a shape that will permit its manual manipulation during the tightening or loosening of the cable within the handle. A split coupling 18 slides over the cable into the inside 19 of the sleeve 15 and wedges the cable tightly within same. Screws 9 are used to hold the parts of the coupling 18 in and to the sleeve, as indicated.

The jaw unit is used for holding the electrodes 100, ready for use. It has a holder blade 26 with its contact surface 20 flat, and V-slotted at 25 symmetrically from each end. Another holder blade 21 half-round in form faces the first mentioned holder blade 26 and has its contact face 22 concaved with V-slots 25 cut in its edges 23 to align symmetrically with those in blade 26. These slots are employed for gripping the electrodes 100 in the jaw unit when the device is used. They also serve to keep the blades within socket 24 through the use of a rectangular pin 27 set therein for preventing their misplacement. The screws 28 lock the blades to the socket body as shown. The holder blade 26 has an angular thumb lever 29 extending laterally from it with its shank 29 easily passing through a hole 30 in the blade to a segment shaped head member 31 resting in the concave portion of the other blade 21. This lever and head are manipulated to spread the outer end portions of the blades to remove or insert electrodes. This lever has an insulated covering 32 to make it safe for the operator to handle. The socket 24 is of conducting material, as also are the blades 21 and 26, and has its interior flat on one side 33 to fit the blade 26 and rounded on the opposite surface 34 to fit the exterior surface of the holder blade 21. Both blades 26 and 21 fit neatly in the space 35 provided between the surfaces 33 and 34, while an extension lip 36 is employed to contact the back of the blade 26 and align with the lever 29, at the limit of its possible travel, when pressed on.

The interior of the socket is limited by its bottom surface 37. Its exterior is cylindrical and closely fitting in the handle 1 at the end portion 12 and beyond. The inner end 38 of the socket 24 has a cylindrical post 39 that reciprocates through lateral holes 4 therein under tension of a coil spring 41 and nut 42 so as to form a resilient catch. This post is adapted to pass into the lateral holes 4 in the handle 1, and hold the socket in a location corresponding thereto. This post 39 is limited in movement so it cannot extend beyond external surface of the handle 1 and interfere in any way during its insertion. The remaining section of the socket consists of a flat insertion member 44 that fits between the knife blades 8 and makes conducting contact therewith.

When the insertion plug and jaw unit are properly placed in the handle with the cable attached, the device is ready for use. The assembly of the device consists in attaching the conducting cable 7 in the lug 11, so the current will flow to the spring knife blades, and handle 1 will retain the lug against its cross bar 5 against longitudinal and transverse movement. The cable is held securely in the barrel piece 15 with its split coupling 18 reinforcement, and the screws 9. The tightening of the barrel piece 15 by screwing it into the portion 3 of the handle serves to press the insertion plug 6 tightly against the cross bar 5. In this position the cable, insertion plug and handle are rigidly held together with the handle 1, covering all live or bare conducting parts of the cable and plug. The jaw unit is now inserted at the other end of the handle 1 into the passage 2 until the socket 24 with its rim 43 presses against the face 45, and its insertion member 44 is knifed between blades 8 of the plug 6 so the contact is complete to the front of the socket. The electrode holding blades 21 and 26 are understood to have been inserted with an electrode in place in their V-slots as described previously. The insertion of the jaw unit requires the pressing in of the post 39 so it will not obstruct. It is kept depressed until it reaches the hole that enables the insertion member 44 to contact the blades 8 of the plug 6. At that point the post rises and locks the jaw unit in place in the handle and in conducting contact with the insertion plug 6. The holder is then ready for operation. When the welding work is done and the jaw unit is to be removed, the post 39 is depressed by the operator with a pencil or small piece of wood. When the post is out of the way under the inner surface of the handle, the jaw unit is pulled out complete and removed from the handle. This unit can then be placed out of the way. Should it be desirable to leave the jaw unit in the handle but electrically dead, then the post is depressed only to permit it to be transferred from the full contact hole to the next further out in the handle, and sufficient to keep the plug contact 6 and those of the jaw unit far enough apart to prevent conduction of current between them.

While but one general form of the invention is shown in the drawing and described in the specification, it is not desired to limit this application to this particular form or in any other way otherwise than limited by the scope thereof, as it is appreciated that other forms could be made that would use the same principles and come within the scope of the appended claim.

Having thus described the invention, what is claimed is:

An electrode holder for welding purposes, comprising in combination, a holder handle having passages therein, a conducting jaw unit insertable within one of the passages and provided with a passage therein for the reception of jaws and for attachment of an electrical circuit thereto, said jaw unit having a front kick plate mounted thereon to butt against and cover the front of the said handle and extension lip means for reinforcing the support of the jaws, a pair of jaw members insertable in the said jaw unit and adapted to be securely hold therein, one of said jaw members having an arcuate wall with its edges adapted to contact against the adjacent surface of the other jaw member and bridge over the same, slots being provided in the portions of the said members adjacent to each other for holding electrodes clamped therein at the portions extending from the said handle, and for holding locking pin pieces and aligning the members in predetermined relation to one another, and an L-shaped lever extending into the space between the said jaw members having a head conforming with the said arcuate wall in one position and permitting the members to be in close contact with each other and in another position with its edges pressing against the internal surfaces of the jaws and separating same against the resilient action of the portion outside of the holder handle for the removal or insertion of the electrodes therein, said lever being relatively short so as not to extend over the handle to interfere with the operation thereof.

MICHAEL GALLO.